United States Patent [19]

Hudson

[11] Patent Number: 4,460,240

[45] Date of Patent: Jul. 17, 1984

[54] SEMICONDUCTOR LASER SCANNING SYSTEM

[75] Inventor: Kenneth C. Hudson, Philadelphia, Pa.

[73] Assignee: RCA Corporation, New York, N.Y.

[21] Appl. No.: 410,548

[22] Filed: Aug. 23, 1982

[51] Int. Cl.$^3$ .......................................... G02B 27/17
[52] U.S. Cl. ................................................ 350/6.8
[58] Field of Search ........................ 350/6.8, 6.4, 6.1

[56] References Cited

U.S. PATENT DOCUMENTS

| 2,779,819 | 1/1957 | Graham et al. | 178/7.2 |
| 3,646,568 | 2/1972 | Woywood | 346/108 |
| 4,070,089 | 1/1978 | Grafton | 350/7 |

OTHER PUBLICATIONS

Tibbetts, R. E., & Wilczynski, J. S., "Scanning Lens," IBM Technical Disclosure Bulletin, vol. 14, No. 11, Apr., 1972, pp. 3262-3263.

Primary Examiner—John K. Corbin
Assistant Examiner—Rebecca D. Gass
Attorney, Agent, or Firm—Joseph S. Tripoli; Robert L. Troike; Christopher L. Maginniss

[57] ABSTRACT

An optical scanning system provides an intensity-modulated, illuminated spot for contour measurements using phase detection. Two semiconductor lasers, which are thermally coupled but are electrically isolated, transmit light beams which are translated and separately collimated by the optics of the system. The collimated beams are then combined on adjacent reflecting facets of a rotating polyhedron to form a narrow beam which illuminates a small spot at relatively high intensity. The beam scans across the target surface over an angle of 120 degrees.

19 Claims, 10 Drawing Figures

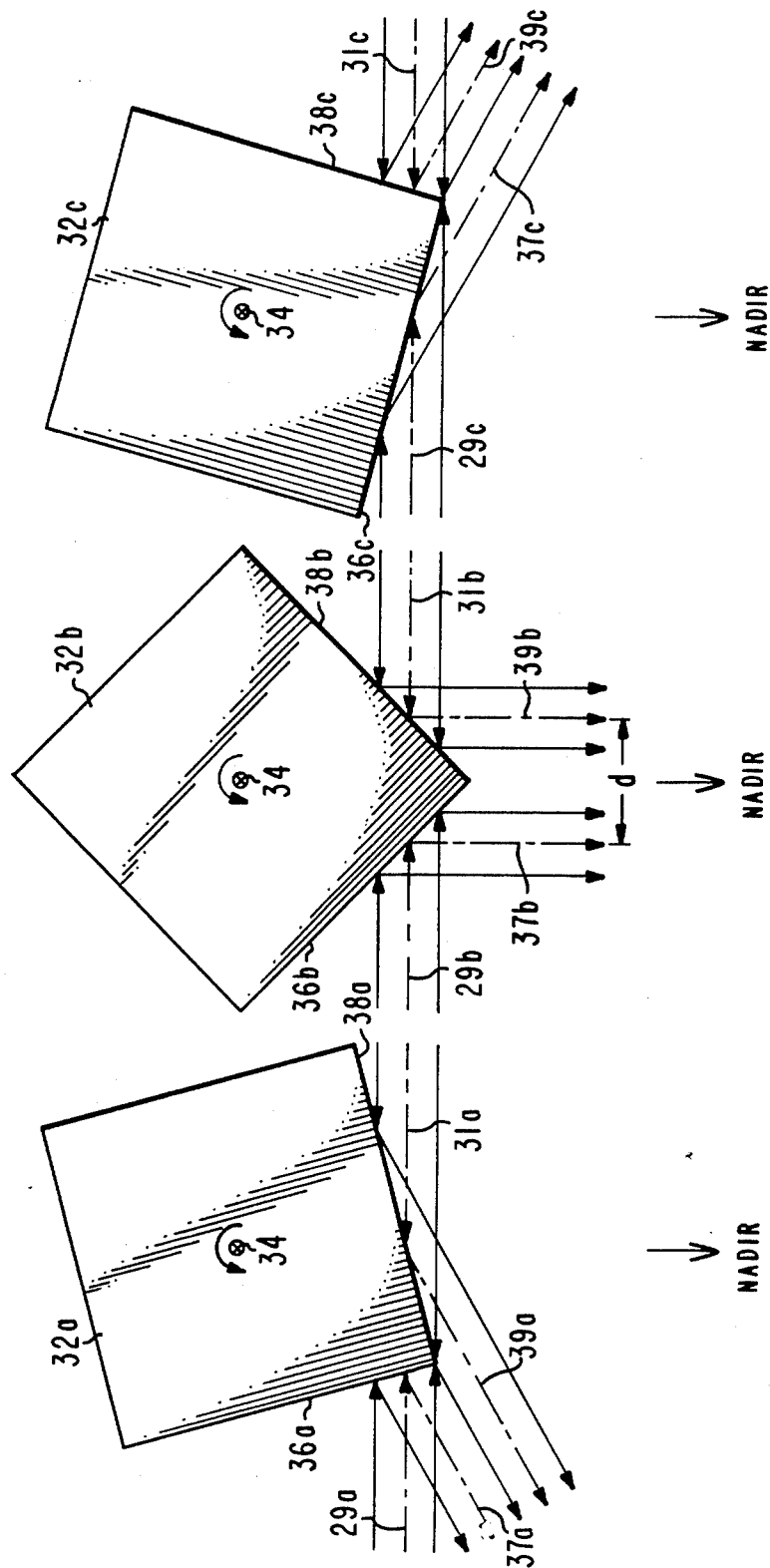

SEMICONDUCTOR LASER SCANNING SYSTEM

This invention relates generally to an optical scanning system. More particularly, the invention relates to an apparatus for forming a scanning beam which is especially useful in airborne systems used for mapping ground elevation levels.

The technique of contour mapping generally employs an airborne scanning laser which emits an RF modulated signal, a sensor for tracking the ground spot illuminated by the scanning laser, and means for measuring the phase of the return signal relative to the transmitted signal to determine the distances of ground objects. A signal processing unit responds to the phase contour signals to develop a three-dimensional mapping.

In order for this technique to be usable for certain types of applications, the scanning apparatus should include a small, efficient laser source, which provides a high-radiance beam that can be intensity modulated, for example, at about 20 MHz. Semiconductor lasers, or laser diodes, appear to meet these requirements. They are about 10-35 percent efficient, they are compact, and they can be intensity modulated by direct modulation of their drive current. However, semiconductor lasers also present certain disadvantages. They are limited in power output to a few watts, depending upon the given application they might require cooling at cryogenic temperatures, and they exhibit an unusual aspect ratio (length-to-width) of their emitting area of 100 to 1 or more, making it difficult to provide an efficient beam forming system.

In accordance with one embodiment of the present invention, an apparatus is disclosed for forming a single scanning beam of light from two separated light sources. The apparatus includes first lens means responsive to the light sources for providing first and second light beams collimated in a first direction. Optical transmission means translate and separate the first and second collimated light beams. Second lens means respond to the translated and separated first and second collimated light beams to provide third and fourth light beams collimated in a second direction which is orthogonal to the first direction. The apparatus also includes means for redirecting the third and fourth light beams. A polyhedron which has at least two conterminous light-reflecting facets and which is rotatably mounted about an axis which is parallel to each of the light-reflecting facets is positioned such that the redirected third and fourth light beams impinge on two adjacent light-reflecting facets of the polyhedron and, when reflected therefrom, form the single scanning beam of light which scans across a target surface as the polyhedron rotates.

In the drawing:

FIG. 3b is a side view of the light path of FIG. 3a;

FIG. 5a, 5b and 5c depict three positions of the polyhedron of the embodiment of FIG. 1.

Figure 1:
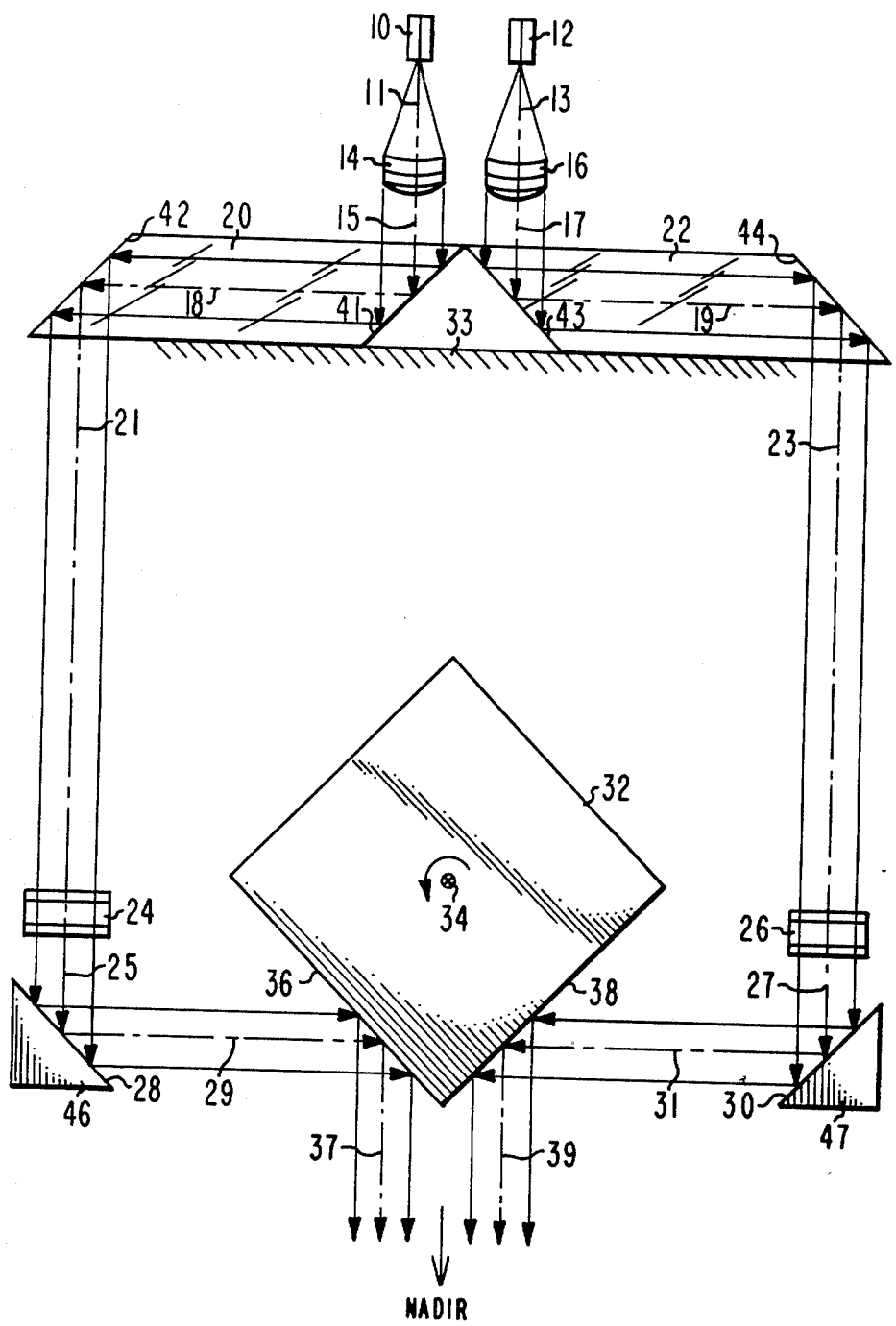
FIG. 1 is an orthogonal view of the preferred embodiment of the present invention.

The apparatus shown in FIG. 1 is designed for use in an airborne scanning system. FIG. 1 illustrates the beam forming and scanning portion of the system. As an aircraft carrying this apparatus proceeds in a direction normal to the paper, a beam of light illuminates the ground, scanning across the direction of flight, starting at a point 60 degrees to the left of the axis directed toward the nadir, and continuing to a point 60 degrees to the right of the axis directed toward the nadir. A moment later, a subsequent beam repeats the scan process. By taking into consideration the speed of the aircraft and the width of the illuminated ground spot in the direction of aircraft travel (referred to as the "cross-scan" direction), one may compute the scan repetition rate required to map the contours over the entire ground surface within an arc of 120 degrees along the direction of flight.

Referring to FIG. 1, sources 10 and 12 radiate illumination shown, respectively, as diverging rays 11 and 13. In a later discussion, in conjunction with FIGS. 2a-2c, it will be shown that the light sources of the preferred embodiment are semiconductor lasers. Light ray 11 is collected and substantially collimated in a first direction by lens 14. Light beam 15 enters rhomb 20 where it impinges upon inwardly-reflecting surface 41 to become light beam 18 which, in turn, impinges upon inwardly-reflecting surface 42 to form light beam 21 which then exits rhomb 20. Lens 24 collects light beam 21 and substantially collimates it in a second direction (not shown in FIG. 1), which is orthogonal to the collimation provided by lens 14. Light beam 25, substantially collimated in both the scan and cross-scan directions, impinges on reflecting surface 28 to form light beam 29, which then impinges on a reflecting facet 36 of rotating polyhedron 32 and is then deflected generally downward as light beam 37.

In a similar manner, diverging light ray 13, which is radiated from source 12, is collected and substantially partially collimated by lens 16. Light beam 17 enters rhomb 22, is reflected by surface 43 to form light beam 19 which reflects off surface 44 and exits rhomb 22 as light beam 23. Lens 26 collects and substantially collimates light beam 23 to produce light beam 27 which is then reflected by surface 30 to form light beam 31 which then impinges on reflecting facet 38, adjacent to facet 36. Light beam 31 is deflected generally downward as light beam 39 which is parallel to light beam 37.

The size of the ground spot, or "footprint," is a critical parameter of the system since it determines the resolution of the system in detecting targets. It must be sufficiently small as to concentrate the available energy from the laser source; yet it must be large enough to allow complete ground coverage for a reasonable scanning rate. For this reason, a cross-scan beam divergence of six inches at an aircraft altitude of 1000 feet was selected as a requirement. Relating this to the optics of the present invention, it is seen that lenses 24 and 26, the lenses which collimate in the cross-scan direction, must provide a divergence of 0.5 milliradians (mrad).

Looking now at laser semiconductors, a typical one, such as Model LCW-1000, sold by Laser Diode Laboratories of Metuchen, N.J., includes an emitting junction of 0.016 inch by 0.0001 inch (16 mils by 0.1 mil). For the purpose of laser mode control and thermal considerations, a shallow saw cut of 4 mils divides the laser into a dual cavity configuration, still, however, joined electrically at the negative electrode. In order to produce a beam divergence of 0.5 mrad using the above-described semiconductor laser, it would be necessary to provide a very large diameter lens with a focal length of 32 inches, an impractical demand on such a system. In addition, an aspect ratio of the emitting region of 160 to 1 would make it impossible to obtain an efficient optical beamforming system.

In order to overcome the difficulties imposed by the 16-mil emitting junction, the preferred embodiment of the present invention uses two separate diodes having emitting junctions whose dimensions are 5 mils by 0.1 mil, obtained by a saw cut fully through the typical diode described earlier. The two semiconductor lasers are positioned with their 5-mil dimensions lying on parallel lines which are spaced by one inch, in a liquid-nitrogen Dewar such as, for example, Model IR-14R sold by Cryogenic Associates of Indianapolis, Indiana.

Figure 2A:
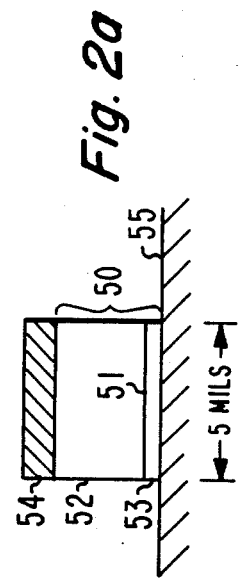
FIG. 2a illustrates a semiconductor laser useful in the embodiment of FIG. 1.

FIG. 2a illustrates semiconductor laser 50, similar to lasers 10 and 12 of FIG. 1. Semiconductor laser 50 may be a ternary heterojunction diode on a gallium arsenide (GaAs) substrate. FIG. 2a shows p-n emitting junction 51, having dimensions 5 mils by 0.1 mil, between the n-type GaAs substrate 52 and a p+-type GaAs anode 53. Substrate 52 is coupled to negative bus 54 and anode 53 is maintained in thermal contact with heat sink 55.

Figure 2B:
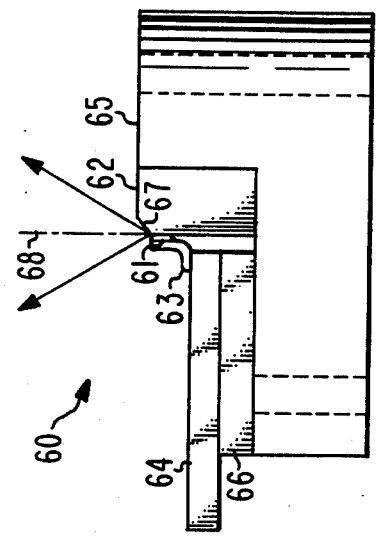
FIG. 2b illustrates a typical cryogenic laser diode mount, including the laser diode.

FIG. 2b illustrates a typical cryogenic laser diode mount 60 suitable for placement behind an optical window of a Dewar of the type mentioned earlier. The anode of laser diode 61 is held in place against copper heat sink 62, and the cathode is coupled to gold ribbon 63 which is electrically coupled to negative bus contact 64. Mounting block 65 supports heat sink 62 as well as beryllium oxide (BeO) insulator 66 which provides electrical isolation between contact 64 and block 65. Surface 67 of heat sink 62 is chamfered at an angle which prevents interference with the light emissions 68 of laser diode 61.

Figure 2C:
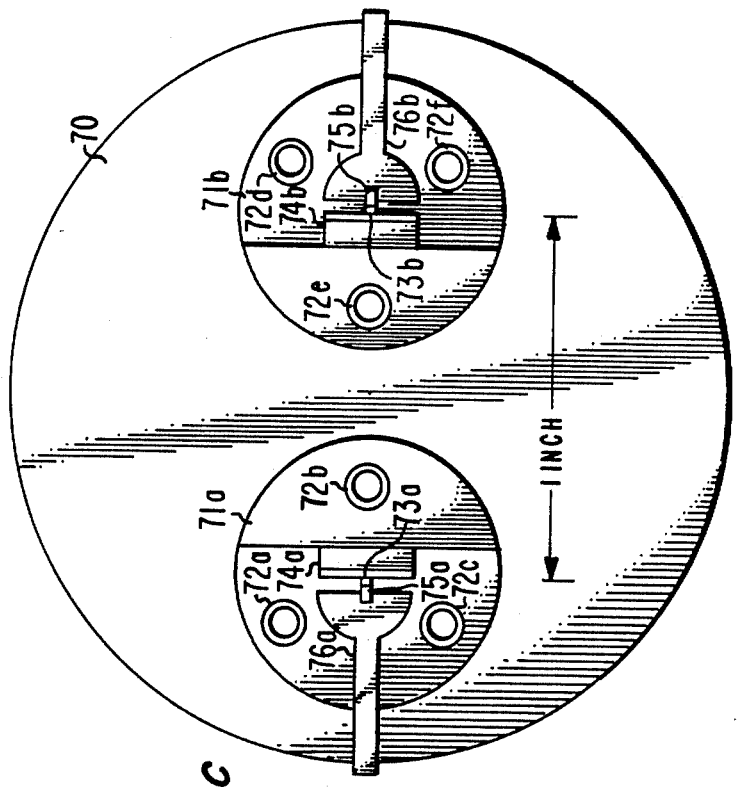
FIG. 2c illustrates a dual cryogenic laser diode mount useful in the embodiment of FIG. 1.

FIG. 2c illustrates a dual cryogenic laser diode mounting configuration applicable to the embodiment of the present invention depicted in FIG. 1 and suitable for placement behind the optical window of a Dewar. Laser diode mounts 71a and 71b, similar to mount 60 of FIG. 2b, are fastened to cryogenic cold finger 70, also referred to as a copper cell, by bolts 72a through 72f. The emitting junctions of laser diodes 73a and 73b lie along parallel lines separated by one inch. The anodes of diodes 73a and 73b are coupled, respectively, to heat sinks 74a and 74b, and the cathodes are coupled, respectively, via gold ribbons 75a and 75b to negative leads 76a and 76b.

The configuration of FIG. 2c adapts the two laser diodes for use with the optics shown in FIG. 1 and described in more detail below. The physical proximity of the laser diodes permits their operation within a stable thermal environment, yet their electrical isolation permits each to be driven at optimum current. The one-inch separation also reduces the concentration of the heat load on the heat sink to prevent a hot spot.

Figure 3A:
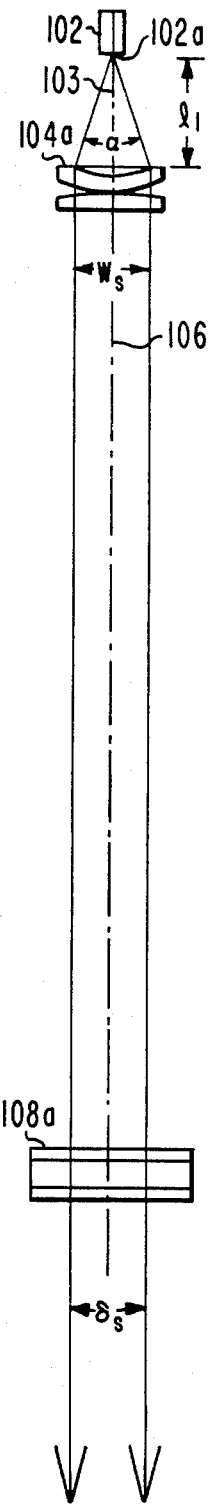
FIG. 3a depicts the path of light through the lenses of the embodiment of FIG. 1.
Figure 3B:
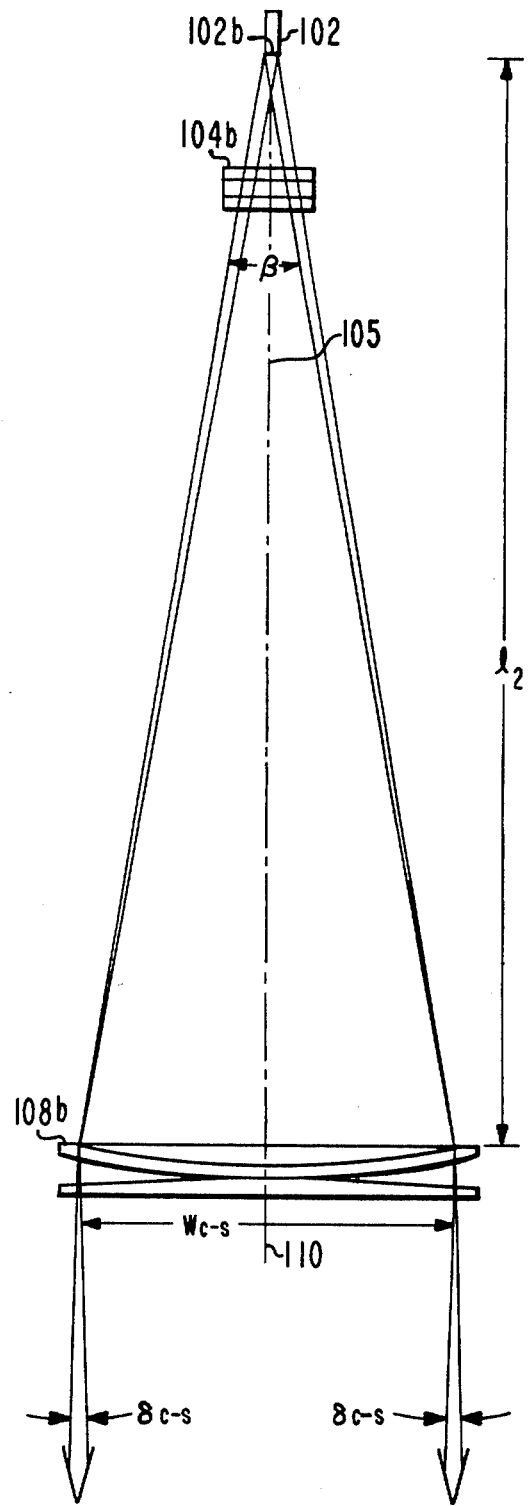

Lenses 14 and 16, as seen in FIG. 1, are substantially identical and are of a type shown in a first view in FIG. 3a as lens 104a and in a second view in FIG. 3b as lens 104b. FIG. 3a exhibits, by a straight-line equivalent of the light radiated by semiconductor laser 102 in the scan direction, the light collecting and collimating effect of lens 104,A,B. Similarly, FIG. 3b exhibits, by a straight-line equivalent of the light radiated in the cross-scan direction, the light collecing and collimating effect of lens 108a,b.

Lens 104a,b is a three-element, air-spaced, f/1.4 cylinder lens having an effective focal length $l_1$ of one inch and providing near diffraction-limited performance. The curved aspect 104a of lens 104a,b shown in FIG. 3a at its effective focal length distance of one inch from semiconductor laser 102 collects the light energy from the 0.1-mil-thick emitting junction 102a of semiconductor laser 102 at an angle α of 41.8 degrees to produce a substantially collimated light beam 106 having a scan-direction width $w_s$ of 0.71 inch. It is estimated that the pattern of radiation intensity emitted from the narrow dimension of a typical semiconductor laser is such that an f/1.4 lens at a one-inch effective focal length will collect in excess of 80% of the laser power in the fan of rays along this direction. The plane aspect 104b of lens 104a,b shown in FIG. 3b imparts negligible divergence and diffraction to light ray 105.

The extent to which lens 104a collimates ray 103 in the scan direction is determined by the contributions of the beam geometry and the diffraction and aberration of the lens. The beam divergence due to geometric considerations, i.e., a 0.1-mil light source 102a at a one-inch distance, results in a beam spread of 0.1 mrad. In addition, contributions to the beam divergence resulting from lens diffraction and aberration produce a total beam divergence $\delta_s$ of approximately 0.28 mrad in the direction of scan.

Figure 4:
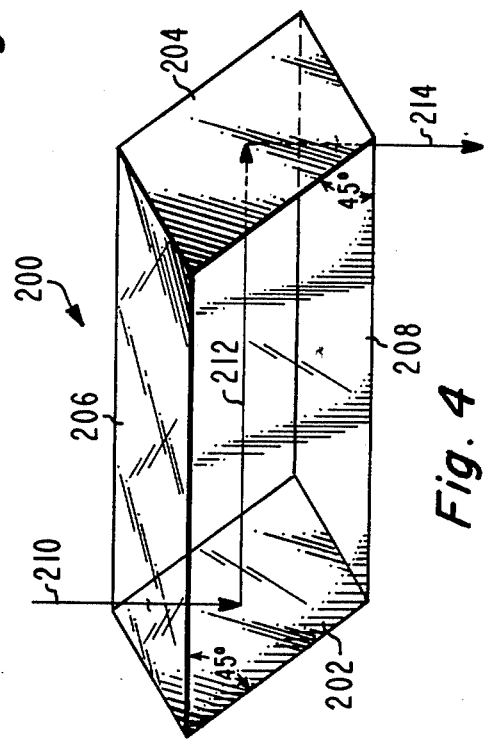
FIG. 4 is an isometric view of one of the rhombs of the embodiment of FIG. 1.

Referring again to FIG. 1, the light beams 15 and 17, emerging from lenses 14 and 16, which are substantially collimated in the direction of scan, are directed onto rhombs 20 and 22, respectively, which are each rigidly attached to the upper flat surface of mounting plate 33. Referring to FIG. 4, rhomb 200 is shown, similar to rhombs 20 and 22 of FIG. 1, which are substantially identical. Rhomb 200 comprises a solid block of optically transmissive material, such as glass, having the form, in the example shown, of a square prism with oblique ends 202 and 204 which form parallel planes. The plane of surface 202 meets the plane of surface 206 at a 45 degree angle, and the plane of surface 204 meets the plane of surface 208 at a 45 degree angle. Surfaces 206 and 208 are parallel planes. Surfaces 202 and 204 are inwardly mirrored so as to completely reflect all light traveling within rhomb 200. Surfaces 206 and 208 are transparent to all light impinged upon them.

The effect of rhomb 200 on incoming light beam 210 perpendicularly striking surface 206 is to translate the beam. Beam 210 passes through surface 206, is reflected by mirrored surface 202, forming light beam 212 which is parallel to surfaces 206 and 208. Beam 212 is reflected by mirrored surface 204, forming light beam 214 which passes out of rhomb 200 through surface 208. Outgoing beam 214 is parallel to incoming beam 210, but is displaced by the average length of rhomb 200. It may easily be seen that any light beam striking perpendicularly against surface 206 and reflected by mirrored surfaces 202 and 204 will travel precisely the same distance as light beam 210-212-214. Hence, it is seen that rhomb 200 has nondispersive optical qualities for such light beams.

The physical configuration of rhomb 200 as shown by example in FIG. 4 should not be construed as a limitation on the invention. The only restrictions on the form of that device are that its reflecting surfaces must be parallel and that it must be optically nondispersive and immune to angular deviation between incoming and outgoing beams, i.e., the optical equivalent of a piece of glass of uniform thickness to all incoming light beams.

The beam translating function provided by rhombs 20 and 22, as shown in FIG. 1, may be replaced by mirror pairs mounted in positions corresponding to the reflecting surfaces of rhombs 20 and 22. However, use of such mirror pairs would create a source of rotational instability. A slight rotation of one of rhombs 20 or 22 affects both reflecting surfaces of that rhomb and therefore translates a transmitted beam by a very small amount. However, a beam translated by a mirror pair would be rotated by twice the rotational instability angularly about two orthogonal axes of each mirror.

Lenses 24 and 26, as seen in FIG. 1, are substantially identical and are of a type shown in a first view in FIG. 3a as lens 108a and in a second view in FIG. 3b as lens 108b. Lens 108a,b is a three-element, air-spaced, f/2.8 cylinder lens having an effective focal length $l_2$ of ten inches and providing near diffraction-limited performance. The curved aspect 108b of lens 108a,b shown in FIG. 3b at its effective focal length distance of ten inches from semiconductor laser 102 collects the light energy from the 5-mil-wide emitting junction 102b of semiconductor laser 102 at an angle $\beta$ of 20.6 degrees to produce a substantially collimated light beam 110 having a cross-scan direction width $w_{c-s}$ of 3.57 inches. It is estimated that the pattern of radiation intensity from the wide dimension of the emitting junction of a semiconductor laser is such that an f/2.8 lens at a ten-inch effective focal length will collect substantially all of the laser power in the fan of rays along this direction. The plane aspect 108a of lens 108a,b shown in FIG. 3a imparts negligible divergence and diffraction to light beam 106.

The extent of which lens 108b collimates light ray 105 in the cross-scan direction is determined almost exclusively by the geometric contribution to the total beam divergence; the contributions due to lens diffraction and aberration are practically negligible when compared thereto. The geometric divergence, resulting from a 5-mil source at a ten-inch distance, produces a beam divergence $\delta_{c-s}$ of 0.5 mrad in the cross-scan direction to the 3.57-inch beam width. Stated alternatively, at an altitude of 1000 feet, ten-inch lens 108b magnifies the 5-mil junction 102b by a factor of 1200, resulting in an image on the ground six inches wide in the cross-scan direction.

Referring again to FIG. 1, light beams 25 and 27, which are substantially collimated in both the scan and cross-scan directions, impinge upon plane reflecting surfaces 28 and 30, respectively, and are redirected toward reflecting surfaces 36 and 38, respectively, of polyhedron 32. In the present example, beams 25 and 27 strike and reflecting surfaces 28 and 30, which may be part of mirrors 46 and 47, respectively, rigidly positioned at 45 degree angles, to produce collinear beams 29 and 31.

Polyhedron 32, as shown by way of example in FIG. 1, comprises a square prism having outwardly reflective surfaces on each of its lateral faces. Polyhedron 32 is rotatably mounted along a central axis 34 which is parallel to and equidistant from each of the lateral faces. Polyhedron 32 is located between light reflectors 28 and 30 and is positioned such that each of its reflective facets occults a full aspect of the beam transmitted by either light reflector 28 or 30 during sixty degrees of the rotation.

Attention is now drawn to FIGS. 5a, 5b and 5c which depict polyhedron 32 in three significant moments of its rotation about axis 34. In FIG. 5a, counterclockwise-rotating polyhedron 32a is shown in its position where it first fully occults beam 29a on reflecting plane surface 36a and beam 31a on adjacent reflecting plane surface 38a. Beam 29a strikes surface 36a at an incident angle of 75 degrees resulting in a reflected beam 37a which is directed 60 degrees to the left of the nadir. Beam 31a strikes surface 38a at an incident angle of 15 degrees resulting in a reflected beam 39a which is also directed 60 degrees to the left of the nadir.

FIG. 5b depicts polyhedron 32b advanced 30 degrees from its position in FIG. 5a. In this position, beam 29b strikes surface 36b at an incident angle of 45 degrees resulting in a reflected beam 37b which is directed toward the nadir. Beam 31b strikes surface 38b at an incident angle of 45 degrees resulting in a reflected beam 39b which is also directed toward the nadir.

FIG. 5c depicts polyhedron 32c advanced another 30 degrees to the point where surface 36c reaches its final position of full occultation of beam 29c and surface 38c reaches its final position of fully occulting beam 31c. At this position beam 29c strikes surface 36c at an incident angle of 15 degrees resulting in a reflected beam 37c which is directed 60 degrees to the right of the nadir. Beam 31c strikes surface 38c at an incident angle of 75 degrees resulting in a reflected beam 39c which is also directed 60 degrees to the right of the nadir.

The following is a simplified analysis of the size of the footprint illuminated on the ground by the scanning laser beam. Referring first to the ground spot dimension in the direction of scan, it was earlier stated that lenses 14 and 16 produce beams of width 0.71 inches having a divergence of 0.28 mrad. In FIGS. 5a and 5c it is seen that the incoming beams 29a, 31a and 29c, 31c are reflected by polyhedron 32 in its extreme positions 32a and 32c such that the reflected beams 37a, 39a and 37c, 39c are contiguous. Thus, in the extreme positions of 60 degrees from the nadir, the scanning beam has a width of 1.42 inches and a divergence of 0.28 mrad at the polyhedron.

By precise lateral adjustment of one of lenses 14 or 16 (as shown in FIG. 1), it is possible to cause separate beams 37 and 39 to aim at a common target at an altitude of, for example, 1000 feet. With an aiming accuracy of 0.22 mrad, both beams will fall within an angle determined by their angular divergence and the aiming accuracy; viz., two beams each having angular divergence of 0.28 mrad whose principal rays are separated by 0.22 mrad become equivalent to a single 0.50 mrad beam. In this situation the beam separation d at the polyhedron (as shown in FIG. 5b) which is 1.41 inches in the present example, is not a significant factor in determining resolution several hundred feet from the polyhedron. Thus, the beam divergence of 0.50 mrad in the scan direction produces a single spot of 1.8 inches at the minimum altitude of 300 feet. At an altitude of 1500 feet, the dimension of the ground spot at the nadir in the scan direction is 9.0 inches. These spot dimensions presume beam alignment by lateral adjustment of one of lenses 14 or 16 as described above.

Of greater importance, however, is the size of the illuminated ground spot in the cross-scan direction. This dimension, in conjunction with the speed of the aircraft and its altitude, determines the speed of rotation of polyhedron 32 for a specified terrestrial mapping. Although the cross-scan dimension of the footprint varies over the period of scan, due to the increasing distance traversed by the diverging beam when directed away from the nadir, the dimension at the nadir is the minimum and therefore the determining factor when computing polyhedron rotation speed. As was stated earlier, lenses 24 and 26 produce beams 25 and 27 each having a divergence of 0.5 mrad in the cross-scan direction. These beams are eventually reflected from corresponding positions on facets 36 and 38 of polyhedron 32 such that the beam formed by the combination of beams 37 and 39 also has a divergence of 0.5 mrad. The dimension of the illuminated ground spot in the cross-scan direction will equal the magnification factor multiplied by the width of the source (0.5 mils in the present example), where the magnification factor is the ratio of the target distance to the focal length of lenses 24 and 26 ($l_2 = 10$ inches in the present example).

The TABLE below lists, for a range of aircraft altitudes, the cross-scan width of the spot (at the nadir) and, for a range of aircraft ground speeds, the minimum rotational speed, in revolutions per minute, of a polyhedron having four reflecting facets for a complete terrestrial mapping. Greater rotational speeds of the four-faceted polyhedron would provide overlapping scanning sweeps while slower rotation would provide interspaced samples of the target contours.

TABLE

| ALTITUDE (ft.) | SPOT WIDTH (inches) | POLYHEDRON ROTATIONAL SPEED (RPM) | | | |
|---|---|---|---|---|---|
| | | AIRCRAFT GROUND SPEED (MPH) | | | |
| | | 90 | 120 | 150 | 180 |
| 300 | 1.8 | 13200 | 17600 | 22000 | 26400 |
| 500 | 3.0 | 7920 | 10560 | 13200 | 15840 |
| 1000 | 6.0 | 3960 | 5280 | 6600 | 7920 |
| 1500 | 9.0 | 2640 | 3520 | 4400 | 5280 |

The scanning system of the present embodiment was designed for identification of ground targets including military equipment. For this purpose, a modulating signal having a frequency of 20 MHz was chosen. This modulation rate allows detection of targets having heights up to 24.5 feet without phase ambiguities. Greater elevation-mapping ranges are afforded by a lower frequency modulation signal, and greater precision of measurement at smaller ranges would be provided by higher frequency modulation signals.

Thus, the present invention provides apparatus in the form of an optical scanning system which can be used with semiconductor diode laser sources while overcoming some of the problems associated with such coherent light sources.

What is claimed is:

1. An apparatus for forming a single scanning beam of light from two separated light sources, said apparatus comprising:

first lens means responsive to said light sources for providing first and second light beams collimated in a first direction;

optical transmission means for translating and separating said first and second collimated light beams;

second lens means responsive to said translated and separated first and second collimated light beams for providing third and fourth light beams collimated in a second direction, said second direction being orthogonal to said first direction;

means for redirecting said third and fourth light beams; and a polyhedron having at least two conterminous light-reflecting facets, said polyhedron being rotatably mounted along an axis of said polyhedron, said axis being parallel to each of said light-reflecting facets, said polyhedron further being positioned so that said redirected third and fourth light beams impinge on two adjacent light-reflecting facets of said polyhedron and, when reflected therefrom, form said single scanning beam of light which scans across a target surface as said polyhedron rotates.

2. An apparatus for forming a single scanning beam of light having an intensity which corresponds to the sum of the intensities of two separated light sources, said apparatus comprising:

two lens means of a first type, each of said first-type lens means being responsive to a respective one of said light sources, for substantially collimating the light from a corresponding source in a first direction;

two nondispersive optical transmission devices, each having two parallel reflecting surfaces for translating an incoming beam from a corresponding one of said first-type lens means, said two devices being fixedly mounted on a single surface so as to separate said translated beams;

two lens means of a second type, each of said second-type lens means being responsive to a respective one of said translated beams, for substantially collimating the light in a corresponding translated beam in a second direction, said second direction being orthogonal to said first direction;

two light reflectors each fixedly positioned to redirect a corresponding one of said translated beams; and a polyhedron having at least two conterminous light-reflecting facets, said polyhedron being rotatably mounted along an axis of said polyhedron, said axis being parallel to each of said light-reflecting facets, said polyhedron further being positioned so that said two beams redirected by said two light reflectors impinge on two adjacent light-reflecting facets of said polyhedron and, when reflected therefrom, form a single beam of light which scans across an incident surface as said polyhedron rotates.

3. An apparatus for forming a scanning beam of light, said apparatus comprising:

two semiconductor lasers;

two lens means of a first type, each of said first-type lens means being responsive to a respective one of said semiconductor lasers, for substantially collimating the light from a corresponding semiconductor laser in a first direction;

two nondispersive optical transmission devices, each having two parallel reflecting surfaces for translating a light beam from a corresponding one of said first-type lens means, said two devices being fixedly mounted on a single surface so as to separate said translated beams;

two lens means of a second type, each of said second-type lens means being responsive to a respective one of said translated beams, for substantially collimating the light of a corresponding translated beam in a second direction, said second direction being orthogonal to said first direction;

two light reflectors each fixedly positioned to redirect a corresponding one of said translated beams; and a polyhedron having at least two conterminous light-reflecting facets, said polyhedron being rotatably mounted along an axis of said polyhedron, said axis being parallel to each of said light-reflecting facets, said polyhedron further being positioned so that said two beams redirected by said two light reflectors impinge on two adjacent light-reflecting facets of said polyhedron and, when reflected therefrom, form a single beam of light which scans across an incident surface as said polyhedron rotates.

4. The apparatus according to claims 2 or 3 wherein said lens means of a first type is a cylinder lens.

5. The apparatus according to claims 2 or 3 wherein said nondispersive optical transmission devices are rectangular prisms having oblique ends, and said two parallel reflecting surfaces of each of said devices are the inner faces of said oblique ends of said prism.

6. The apparatus according to claim 5 wherein said devices are positioned such that said light beams from said first lens means impinge upon an inner face of one of said oblique ends at an angle of 45 degrees, and said translated light beam is parallel to said light beam from said first-type lens means.

7. The apparatus according to claims 2 or 3 wherein said nondispersive optical transmission device is made of glass.

8. The apparatus according to claims 2 or 3 wherein said lens means of a second type is a cylinder lens, having an effective focal length greater than the effective focal length of said first-type lens means.

9. The apparatus according to claims 2 or 3 wherein said two light reflectors are positioned so that said two beams redirected by said two light reflectors are collinear.

10. The apparatus according to claims 2 or 3 wherein said polyhedron is a square prism.

11. The apparatus according to claim 10 wherein all of the lateral facets of said prism are light reflecting.

12. The apparatus according to claim 11 wherein said polyhedron is positioned such that each lateral facet of said polyhedron occults the entire beam reflected by each of said light reflectors during sixty degrees of the rotation of said polyhedron.

13. The apparatus according to claim 3 wherein said semiconductor lasers are fabricated on gallium arsenide substrates.

14. The apparatus according to claim 3 wherein said semiconductor lasers are physically configured to have their respective emitting junctions form parallel lines.

15. The apparatus according to claim 3 wherein said semiconductor lasers are collocated for thermal equivalence.

16. The apparatus according to claim 3 wherein said semiconductor lasers are electrically separated at their respective cathodes.

17. The apparatus according to claim 3 wherein said two lens means of a first type are of such a size and so located as to collect in excess of 80 percent of the light energy emitted by said corresponding semiconductor lasers.

18. The apparatus according to claim 3 wherein each of said semiconductor lasers is mounted on a corresponding laser diode mount.

19. The apparatus according to claim 5 wherein each of said laser diode mounts is affixed to a cold finger suitable for placement behind the optical window of a Dewar.

* * * * *

UNITED STATES PATENT AND TRADEMARK OFFICE
CERTIFICATE OF CORRECTION

PATENT NO. : 4,460,240

DATED : July 17, 1984

INVENTOR(S) : Kenneth Clifford Hudson

It is certified that error appears in the above-identified patent and that said Letters Patent is hereby corrected as shown below:

Column 10, line 30, change "5" to --18--.

Signed and Sealed this

Eleventh Day of December 1984

[SEAL]

Attest:

GERALD J. MOSSINGHOFF

Attesting Officer     Commissioner of Patents and Trademarks